US009266673B2

(12) United States Patent
Hamby

(10) Patent No.: US 9,266,673 B2
(45) Date of Patent: Feb. 23, 2016

(54) RISER DECK

(76) Inventor: Payge Hamby, Brea, CA (US)

(*) Notice: Subject to any disclaimer, the term of this patent is extended or adjusted under 35 U.S.C. 154(b) by 0 days.

(21) Appl. No.: 13/570,135

(22) Filed: Aug. 8, 2012

(65) Prior Publication Data

US 2013/0206715 A1 Aug. 15, 2013

Related U.S. Application Data

(63) Continuation of application No. 12/049,268, filed on Mar. 14, 2008, now Pat. No. 8,267,263.

(51) Int. Cl.
*B65D 19/00* (2006.01)
*B65G 1/02* (2006.01)
*B65D 19/40* (2006.01)

(52) U.S. Cl.
CPC . *B65G 1/02* (2013.01); *B65D 19/40* (2013.01)

(58) Field of Classification Search
CPC ........... B65D 2519/00323; B65D 2519/00333; B65D 2519/00293; B65D 2519/00298; B65D 2519/00024; B65D 2519/00059; B65D 2519/00562; A47B 47/027; A47B 47/028; A47B 47/021; A47B 57/402
USPC ............. 108/51.11, 57.17, 57.32, 57.33, 191; 211/182–183, 186–187, 189–191, 204, 211/206
See application file for complete search history.

(56) References Cited

U.S. PATENT DOCUMENTS

| | | | | |
|---|---|---|---|---|
| 3,072,262 A * | 1/1963 | Cassel | ........................... | 211/191 |
| 3,695,456 A * | 10/1972 | Lewis | ........................... | 211/191 |
| 4,197,047 A * | 4/1980 | Haldimann | ................... | 414/276 |
| 4,216,729 A * | 8/1980 | Schrader | ....................... | 108/159 |
| 4,358,236 A * | 11/1982 | Dudley | ....................... | 414/795.3 |
| 4,729,483 A * | 3/1988 | Schrader | ....................... | 211/153 |
| 4,846,627 A * | 7/1989 | Steuart | ......................... | 414/800 |
| 4,955,490 A * | 9/1990 | Schafer | ......................... | 211/187 |
| 5,101,737 A * | 4/1992 | Gomez | ....................... | 108/57.18 |
| 5,160,051 A * | 11/1992 | Bustos | ......................... | 211/59.2 |
| 5,388,532 A * | 2/1995 | Wakano | ....................... | 108/55.1 |
| 5,676,066 A * | 10/1997 | Cavalier et al. | ............. | 108/55.1 |
| 5,687,653 A * | 11/1997 | Bumgarner | ................ | 108/57.19 |
| 5,749,481 A * | 5/1998 | Miller | ........................... | 211/191 |
| 5,809,907 A * | 9/1998 | Bumgarner | ................ | 108/51.11 |
| 5,894,946 A * | 4/1999 | Darnell et al. | ................ | 211/193 |
| 6,173,846 B1 * | 1/2001 | Anderson | ..................... | 211/183 |
| 6,260,719 B1 * | 7/2001 | Azzopardi et al. | ............ | 211/189 |

(Continued)

FOREIGN PATENT DOCUMENTS

WO WO 2005044680 A1 * 5/2005 ............. B65D 19/36

*Primary Examiner* — Hanh V Tran
(74) *Attorney, Agent, or Firm* — J. Mark Holland & Associates; J. Mark Holland; Alison L. Adnan

(57) ABSTRACT

Elongated metal risers are oriented perpendicular to the front end of a shelf, and extend from proximate the front edge of the shelf to at least the rear edge of the shelf. A package stored on the shelf is advantageously supported by left and right side risers and a center riser disposed beneath therebetween, thereby forming left and right insertion channels adjacent the center riser. In storing and retrieving objects from the shelf, a forklift machine advances with its left and right forks aligned with the left and right insertion channels, until the forks are securely under the object. By this configuration, a package lacking apertures for receiving the blades of a forklift machine does not need to be secured to a wooden pallet in order to safely maneuver the package on or off of a storage shelf by a forklift machine or similar device.

21 Claims, 16 Drawing Sheets

(56) References Cited

U.S. PATENT DOCUMENTS

| | | | |
|---|---|---|---|
| 6,286,693 B1 * | 9/2001 | Brown | 211/181.1 |
| 6,460,710 B1 * | 10/2002 | Dardashti | 211/184 |
| 6,490,982 B1 * | 12/2002 | Trickett | 108/51.11 |
| 6,974,295 B2 * | 12/2005 | Coblentz | 414/406 |
| 7,007,815 B2 * | 3/2006 | Anderson et al. | 211/191 |
| 7,140,503 B2 * | 11/2006 | Krummell et al. | 211/151 |
| 7,891,507 B2 * | 2/2011 | Shetler | 211/135 |
| 2001/0050034 A1 * | 12/2001 | Gross | 108/51.11 |
| 2004/0112260 A1 * | 6/2004 | Grainger | 108/53.1 |
| 2004/0155003 A1 * | 8/2004 | Anderson et al. | 211/191 |
| 2004/0238470 A1 * | 12/2004 | Wishart et al. | 211/189 |
| 2006/0196842 A1 * | 9/2006 | Taylor et al. | 211/186 |
| 2007/0119808 A1 * | 5/2007 | Wishart et al. | 211/189 |
| 2008/0169256 A1 * | 7/2008 | Shetler | 211/153 |
| 2010/0219146 A1 * | 9/2010 | Hamby et al. | 211/134 |

* cited by examiner

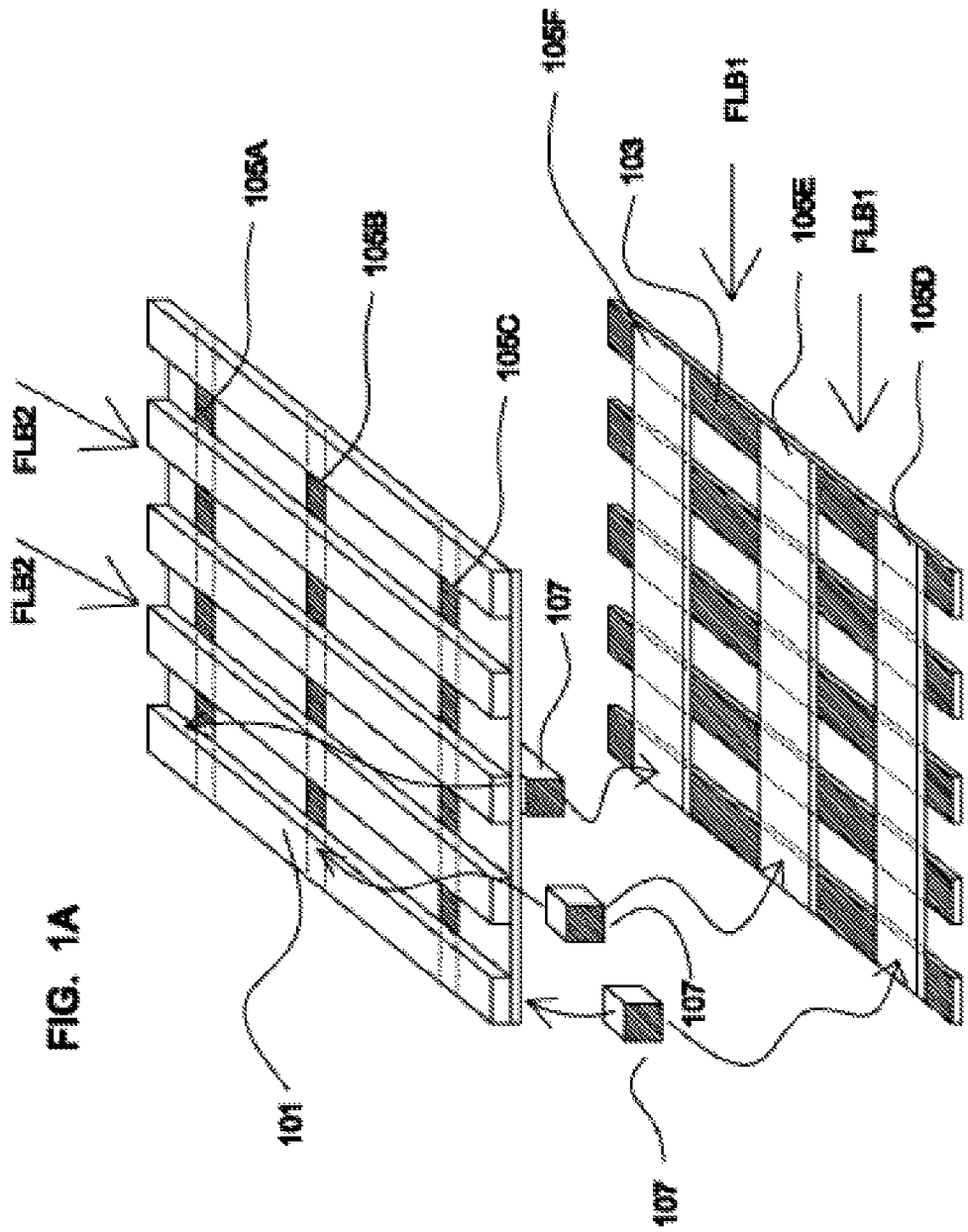

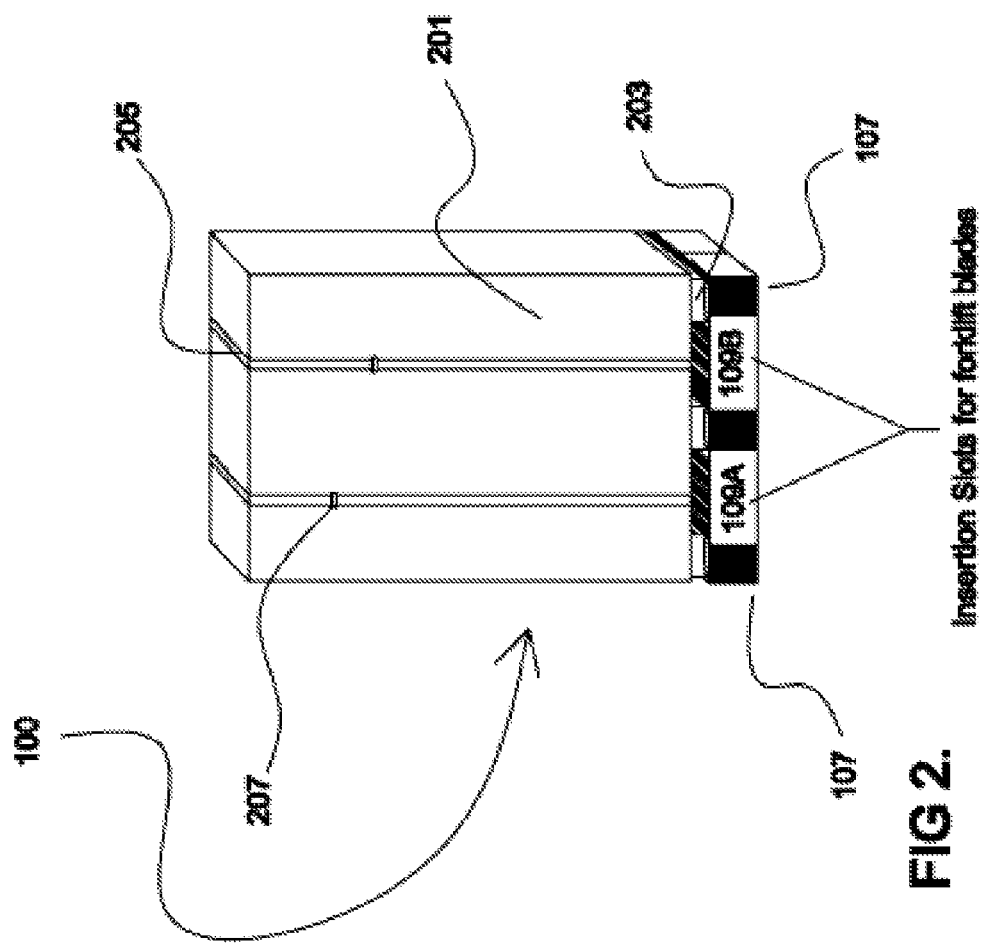

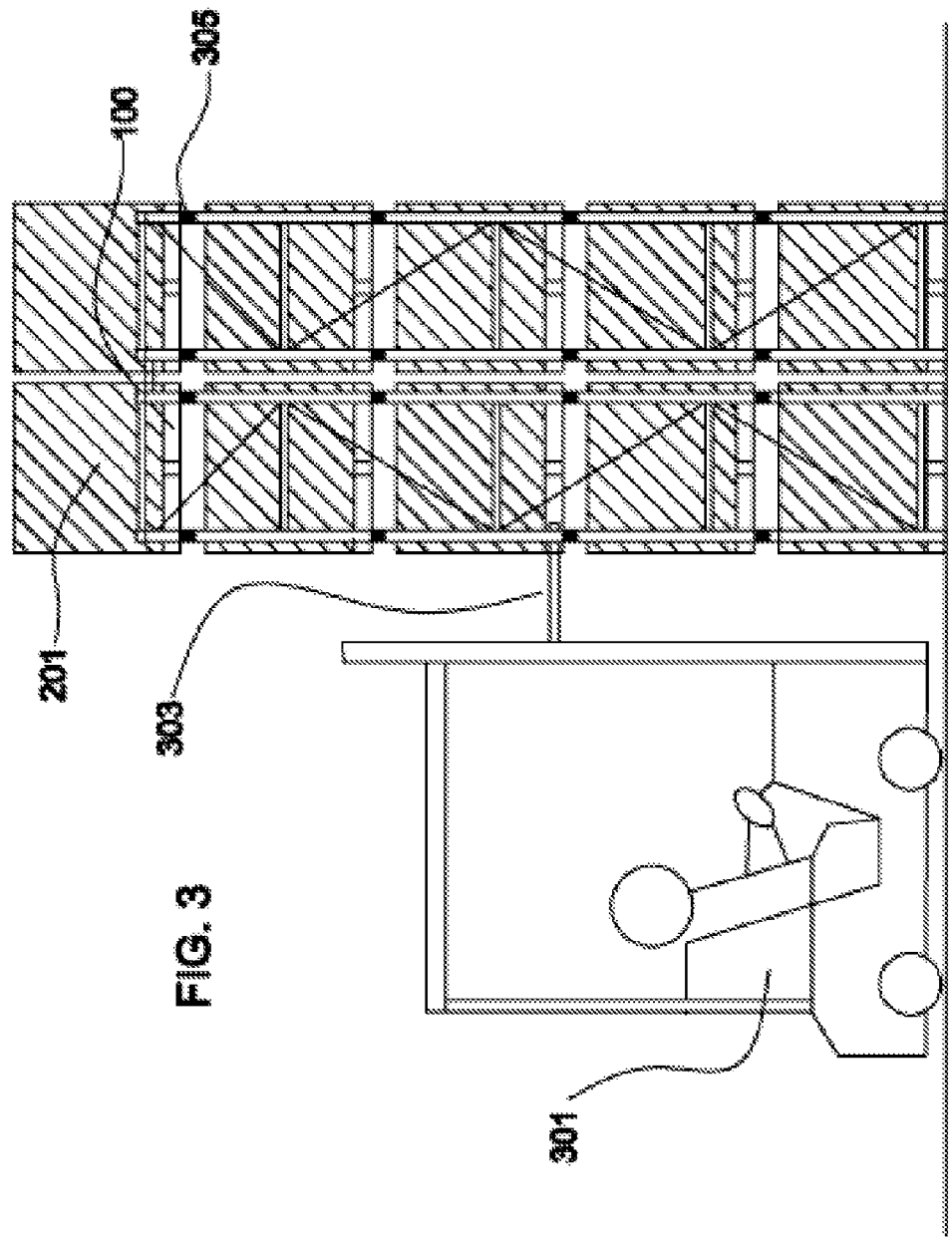

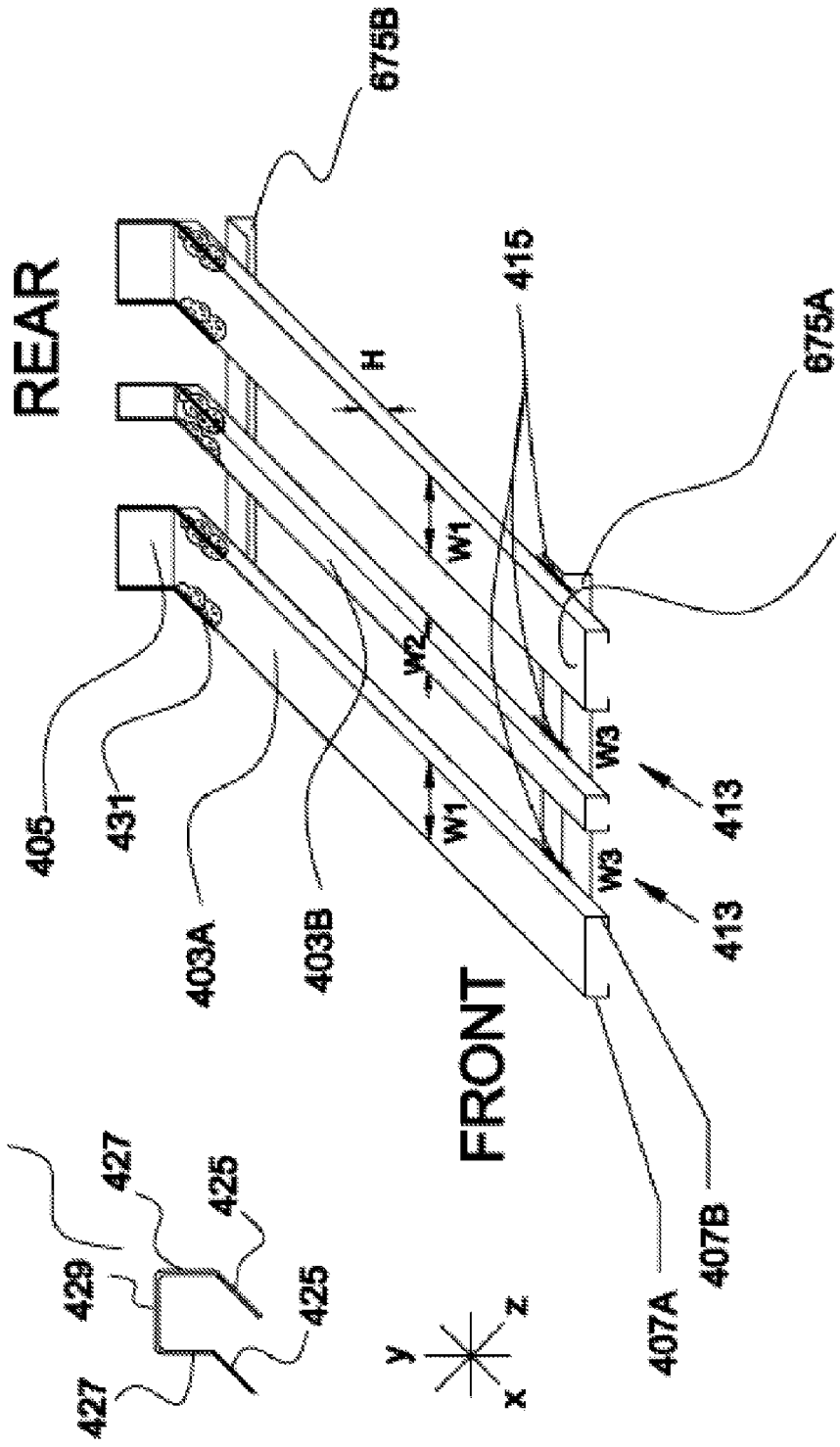
Fig. 4 Riser Deck
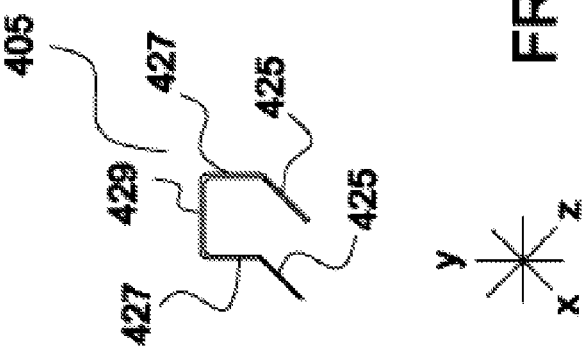
Fig. 4A

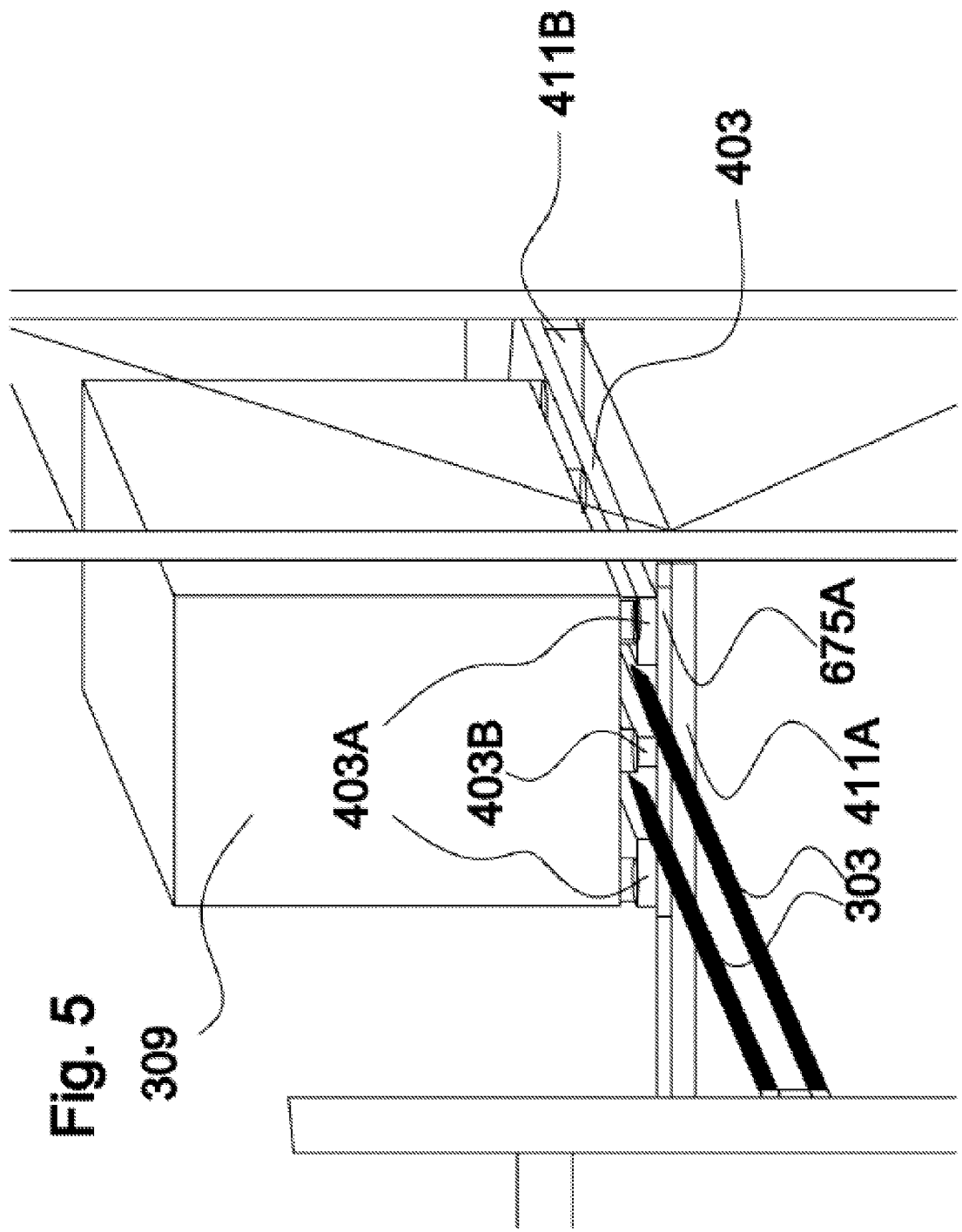

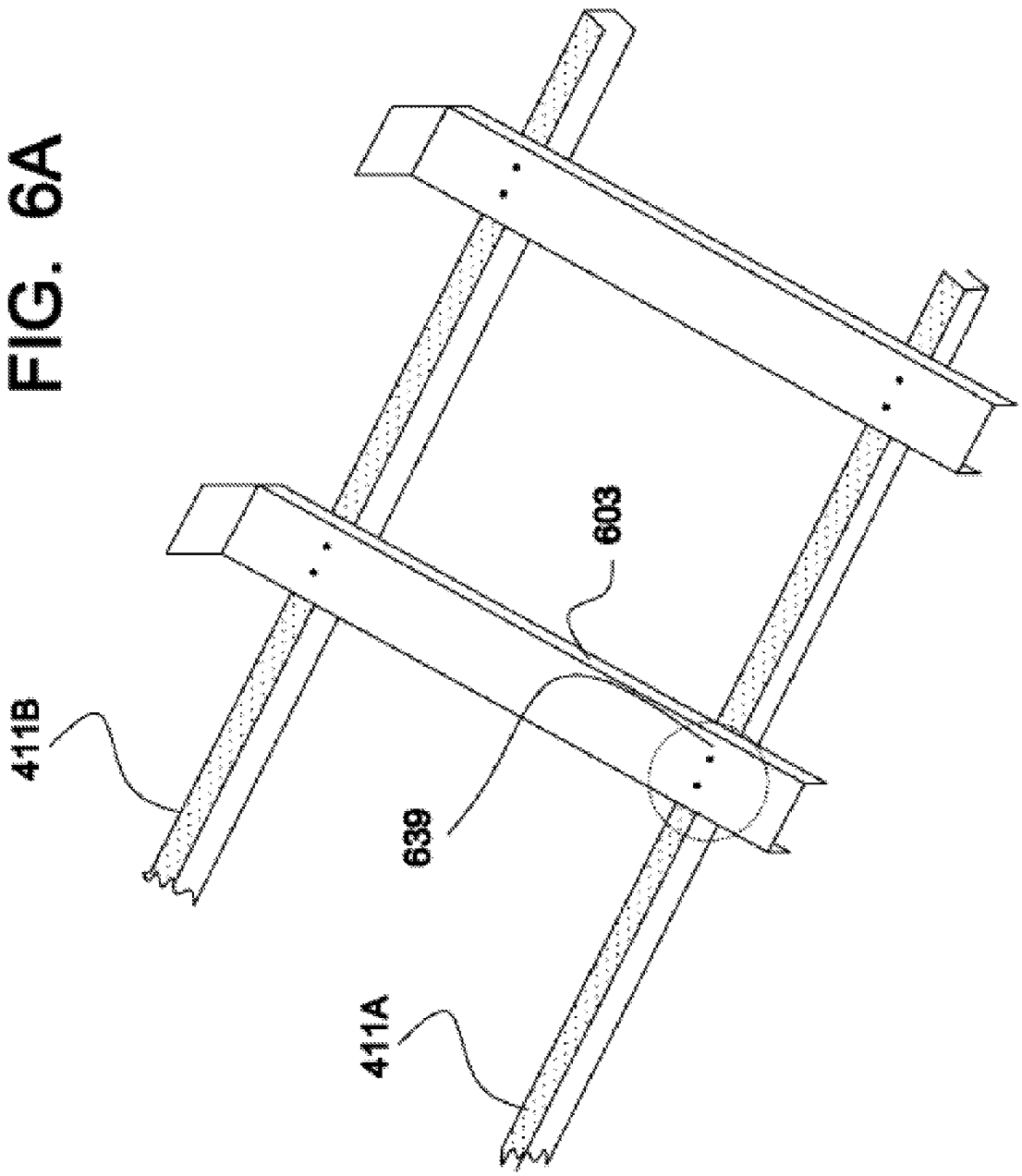

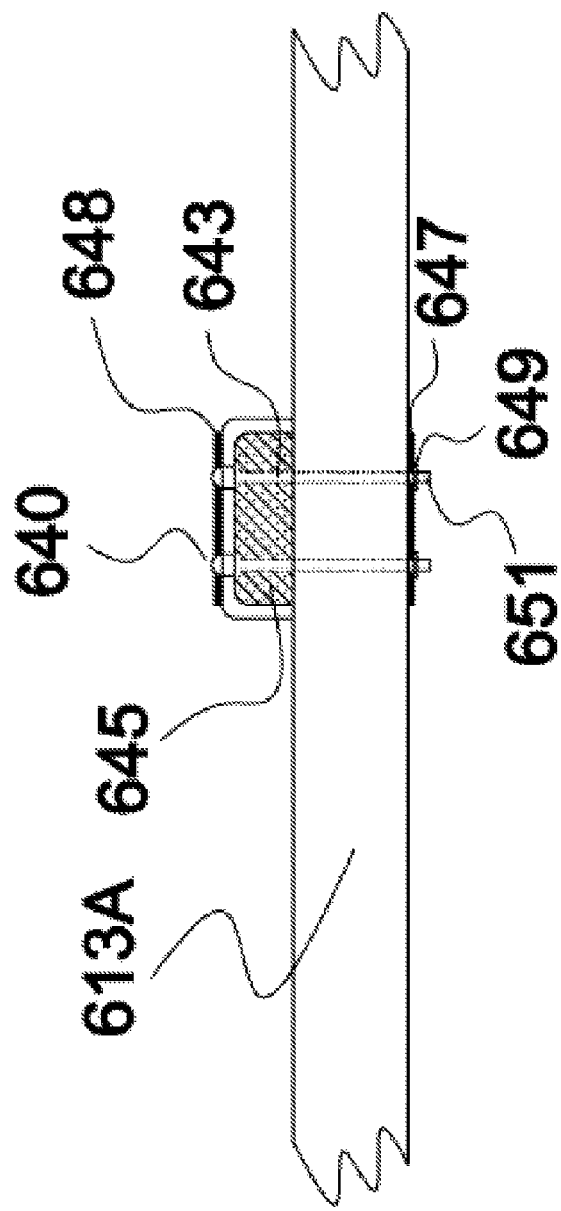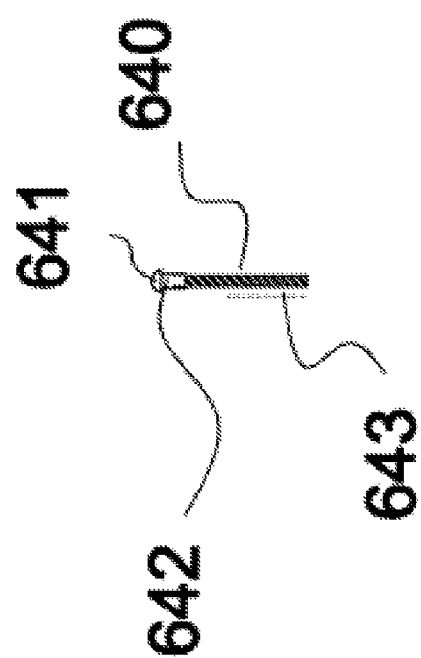
FIG. 6B

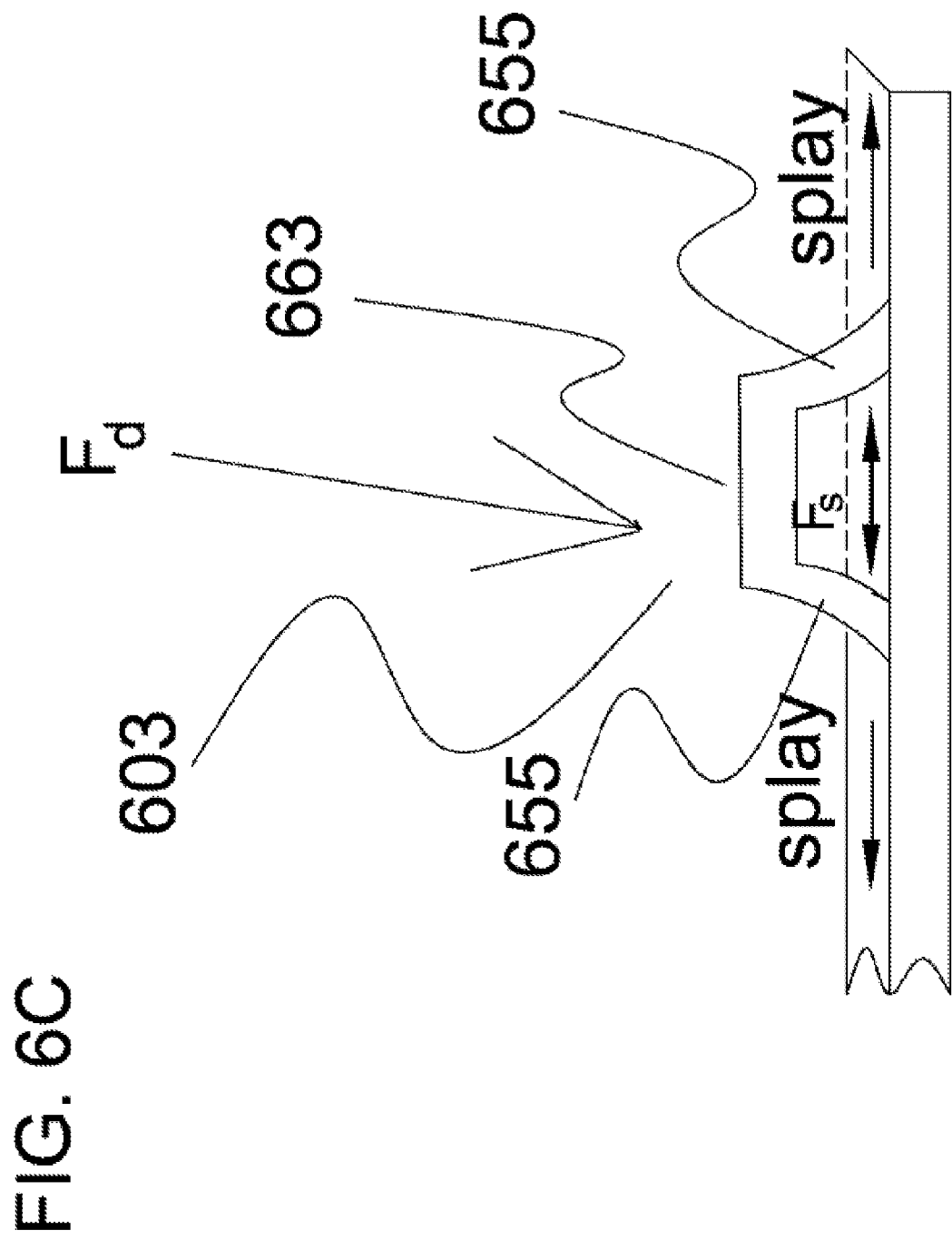

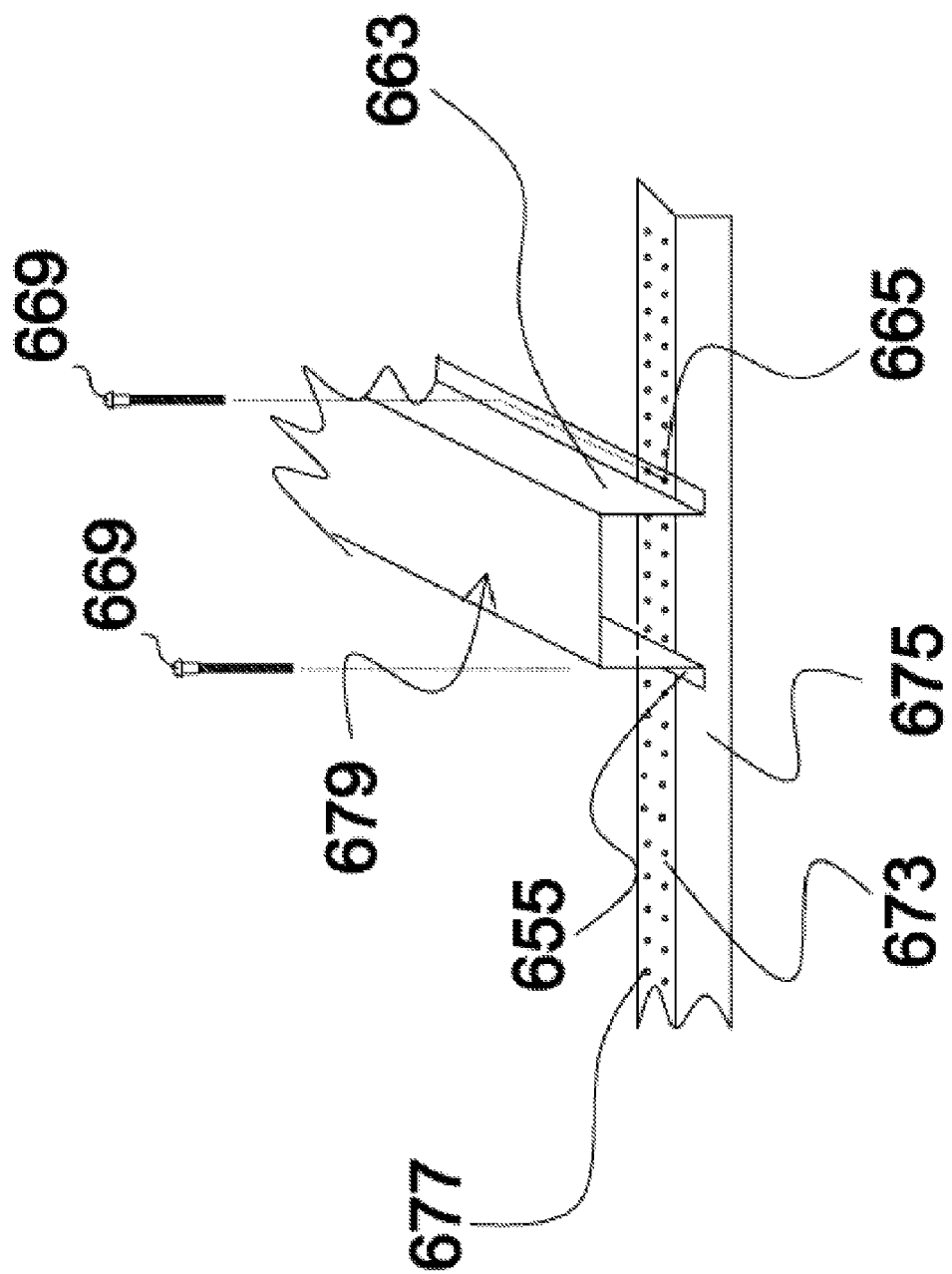

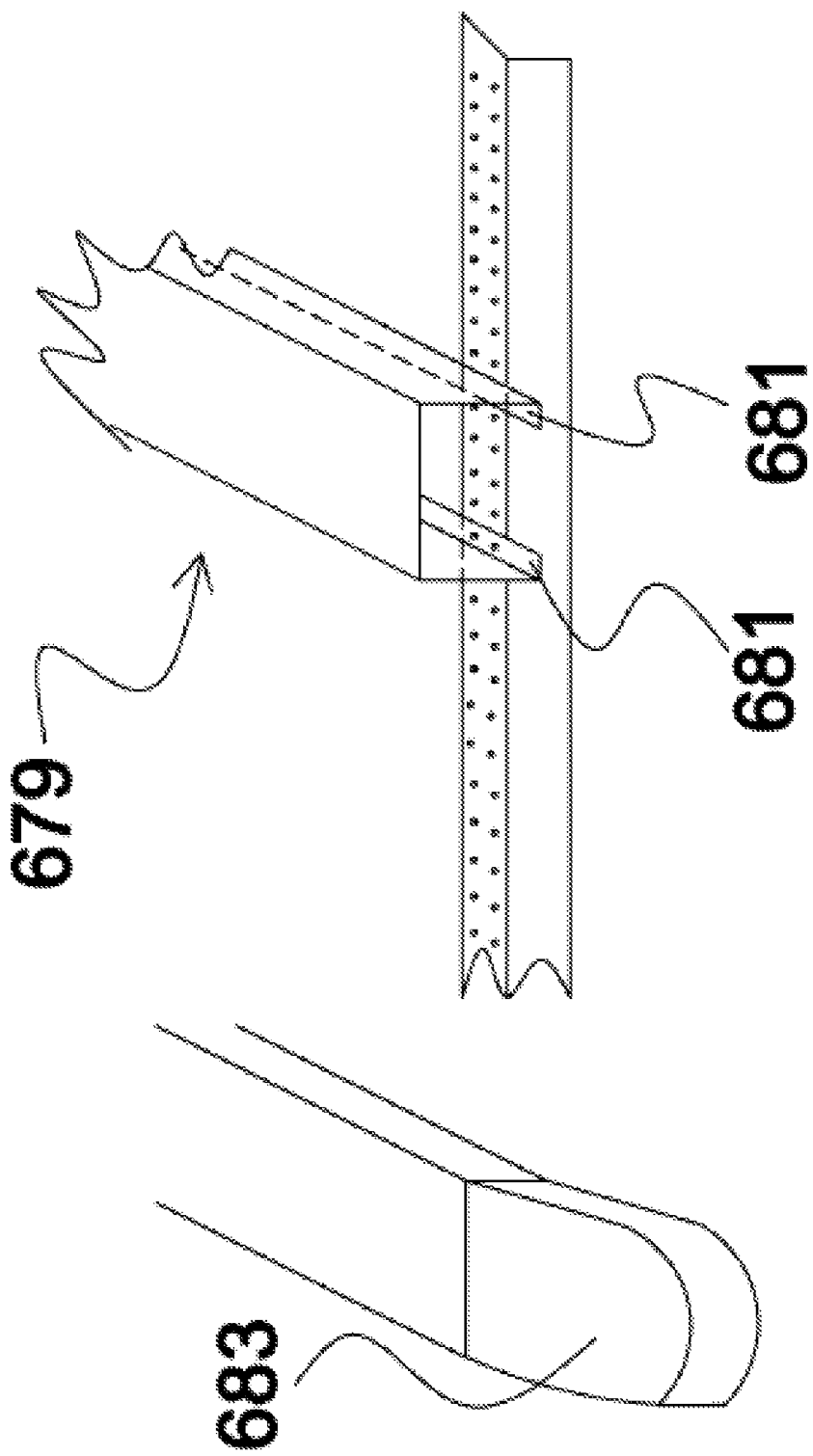

RISER DECK

CROSS-REFERENCE TO RELATED APPLICATION

This application is a continuation of U.S. patent application Ser. No. 12/049,268 filed Mar. 14, 2008 now U.S. Pat. No. 8,267,263, the contents of which are incorporated herein by reference.

FIELD OF THE INVENTION

The present invention relates to the field of warehouse storage devices. More specifically, the present invention relates to pallet risers which eliminate the need for wooden pallets in warehouse storage operations.

BACKGROUND

For decades, the methods and apparatus used in warehouse storage have changed very little. FIG. 1A illustrates an exploded view of a standard wooden pallet 100 similar to those which are used in warehouse storage operations. The top half of the wooden pallet 100 is made up of parallel wooden deck boards 101. The deck boards rest on, and are secured to, three parallel stringer boards 105 which are aligned perpendicular to the deck boards. The outer stringer boards 105A, 105C are disposed along the outer edges of the deck boards, and the center stringer board 105B is disposed halfway between the outer stringer boards. Typically, the deck boards are secured to the stringer boards by nails or high-strength staples. The bottom half of the pallet is identically constructed of three parallel stringer boards 105D, 105E, 105F, secured to a plurality of lower deck boards 103. The top and bottom halves of the pallet are secured to each other by wooden spacer blocks 107 disposed along the stringer boards.

Within industry, the "width" of a wooden pallet is generally the length of the deck boards, and the "length" of a wooden pallet is generally the length of the stringer boards. Regardless of the number of spacer blocks 107 disposed along the stringer boards, a pallet is normally configured to receive the insertion of forklift blades according to the orientation of directional arrows FLB 1. As used throughout this disclosure, this "insertion" side will be referred to as the "front" of the pallet. Because of the symmetry on most pallets the reader will appreciate that a forklift machine can similarly insert its forklift blades from the rear of the pallet. If three spacer blocks are evenly spaced along each stringer board, a forklift machine will also be able to insert its blades between the upper and lower portions of the pallet from the "side" of the pallet, as illustrated by directional arrows FLB2. Wooden pallets capable of receiving an insertion of forklift machine blades from only the front and back are typically known as "two-way" pallets. Wooden pallets that can also receive forklift blade insertion from the left and right sides are typically known as "four-way" pallets FIG. 1B discloses the wooden pallet of FIG. 1A in an assembled state. In many pallets, the bottom half of pallet 100 if typically identical in design to the upper half, such that the pallet will function identically regardless of which side is facing up. A benefit of this design is that if one or more of the wooden deck boards 101 on one side of the pallet are damaged, a warehouse worker may flip the pallet such that the top side of the pallet comprises undamaged wooden deck boards more suitable for supporting various commodities and goods. The insertion slots 109A and 109B receive fork lift blades at the front and rear of the pallet, and, for four-way pallets, insertion slots 11lA, 111B along the sides of the pallet can also receive fork lift blades.

In an alternative embodiment of prior art wooden pallets, "runners" (not shown) approximately the same height as wooden spacer blocks extend the length of the pallet in place of the stringer boards of FIG. 1A. Alternatively, runners may be used in conjunction with stringer boards, each runner being disposed between an upper stringer board and a corresponding lower stringer board in an assembled palette. Runners may have horizontally elongated mouse-hole type slots cut therein, providing "four way" access to a pallet by a fork lift machine.

FIG. 2 depicts a package of goods 201 affixed to a disposable pallet 203 which itself rests on a wooden pallet 100. The package 201 is wrapped with strapping bands 205 which are typically made from either steel or nylon. The strapping bands 205 may be tightened by a strapping machine (not shown) or a hand held tightening device (also not shown) and secured in a taut condition by a wire loop buckle 207 for nylon strapping bands or a metal crimp buckle (not shown) for steel strapping bands. In the embodiment of FIG. 2, the strapping bands 205 secure the package 201 to the disposable pallet 203. A disposable pallet 203 is typically made principally of cardboard, or a combination of cardboard and wood. A disposable pallet 203 is typically less expensive to fabricate than a wooden pallet 100. However, disposable pallets do not normally have insertion slots into which forklift machine blades may be inserted, and are not as rugged as wooden pallets. However, by using a disposable pallet 203 in conjunction with a typical wooden pallet 100, as shown in FIG. 2, the insertion slots 109A and 109B of the wooden pallet facilitate storage and retrieval of the wooden pallet, and any content stored thereon, by forklift machine 301 (FIG. 3). The disposable pallet 203 provides a stable and durable base for package 201. Depending upon the weight, height, and the general stability of a package, when a package with an integral disposable pallet is a placed on a wooden pallet, the package may be secured to the wooden pallet by means of strapping bands to provide additional stability when being moved by a forklift machine.

To initially position a package with a disposable pallet onto a wooden pallet, a variety of techniques are used by warehouse workers. For lighter packages, warehouse workers may tilt a package onto a back edge, slide a wooden pallet underneath it, and lower the package onto the wooden pallet. Because this process typically leaves the back edge of the package hanging off of the wooden pallet, warehouse workers will attempt to center the package on the wooden pallet by creeping the package toward the center of the wooden pallet, often standing on the wooden pallet during the process to prevent the wooden pallet from sliding away.

In embodiments wherein the package is too heavy for warehouse workers to tilt onto a back edge, or creep into a stable position in the center of a wooden pallet, a forklift machine may be used. Forklift machines typically have two parallel blades. Each blade has a vertical portion proximate forklift machine and a horizontal portion extending forward from the bottom of the vertical portion. Fork lift machine blades are typically formed from a continuous steel member such that the vertical portion and horizontal portion meet at a 90° bend at the bottom of the vertical portion of the forklift blades. The horizontal portion of a fork lift blade is about an inch and a half thick, depending on the size of the forklift machine and the weight limit for which it is designed. The horizontal portion of the blade is tapered at the distal end of the blade thereby allowing a skilled forklift driver to advance the tapered end of the blades underneath packages resting on the floor.

When a forklift machine is used to place a package onto a wooden pallet, the forklift driver typically lowers the distal ends (the tips) of the blades to the warehouse floor, with the blades either parallel to the floor, or tilted at a slight downward angle toward the tips. The forklift driver advances the forklift machine toward the package with the distal edge of the blades touching, or almost touching the floor, thereby sliding the blades underneath the package. The blades are then raised, lifting the package off the warehouse floor, allowing warehouse workers slide a wooden pallet underneath the package. The fork lift machine then lowers the package onto the wooden pallet. To allow the forklift machine blades to be withdrawn without pulling the package off of the wooden pallet, the forklift machine driver may tilt the distal ends of the forklift blades downward, thereby lowering the distal edge of the package onto the wooden pallet. As the weight of the package is distributed disproportionately along the back edge of the package, the forklift machine backs up, thereby withdrawing the blades so as to lower the bottom surface of the package out of the wooden pallet without dragging the package off of the wooden pallet. Because the positioning of a package onto a pallet is about one third art, one third science, and one third brute force, the technique described above is simply offered to be illustrative, and is not intended to limit the techniques that warehouse workers use to move large packages by fork lift.

It can be readily appreciated that the proper insertion of forklift machine blades to a desired depth under a package is usually dependent upon several factors. First, it is important that a warehouse floor be smooth and level so that the tapered (distal) ends of the forklift blades can slide underneath the package, rather than piercing the package. A second factor influencing the depth of penetration of fork lift blades under a package or disposable pallet is the angle of the forklift machine blades relative to the ground. To slide fork lift blades underneath a package or disposable pallet resting on the floor, the horizontal portion of the forklift blade is tilted "downward" slightly such that the distal end is the lowest portion of the horizontal section. According to the judgment of the forklift machine driver, this angle of downward tilt is typically between 1 degree and 15 degrees. It can be appreciated that, as a forklift blade advances beneath a package, the angle of tilt will be transmitted to the package itself, gradually lifting the proximal end of the package, thereby incurring progressively greater friction between the forklift blades and the bottom of the package as the forklift machine advances. Eventually, a package may begin to slide backwards from this force before the forklift machine blades have been inserted to a proper depth. To ensure proper depth of insertion, a third factor considered by a forklift machine driver is speed, acceleration and breaking. If the forklift machine is advancing too slowly, excess friction between the package in the blades may begin to push the package backwards before the forklift blades are properly seated underneath the package. If the forklift machine is advancing too quickly, the blades will slide under the disposable pallet until the face of the package impacts the vertical portions of the blades. The package is then driven backwards until the fork lift machine stops. if the forklift machine is advancing at an optimal rate, the horizontal portions of the blades will slide all the way underneath the package until the vertical portions of the forklift blades touch, or very nearly touch the forward face of the package.

It can be readily appreciated that while such techniques are appropriate for sliding the blades of a forklift machine underneath a package resting on a warehouse floor, they would be unworkable and even dangerous if used to retrieve packages stacked on top of each other, or stored on shelves. On the floor, a forklift machine can use the warehouse floor to adjust the height of the tips of the forklift blades before advancing toward a package. For retrieval from shelves, the proper height of the forklift blades can only be estimated. Forklift blades that were too high could penetrate a package, dent the contents stored within the package, or drive the package backward, possibly pushing it off the far end of the shelf. Forklift blades that are aligned to low can smash into a horizontal load beam along the forward edge of a shelf, either progressively damaging shelf, or even tipping over an entire shelf, creating a costly and dangerous situation. Because of these limitations, stacked storage techniques known in the prior art seldom use forklift machines to store a heavy package on a shelf unless the package is disposed on a wooden pallet.

FIG. 3 discloses a forklift machine 301 retrieving a package 201 from a storage shelf 305. The forklift machine has forklift blades 303 are raised to approximately the height of a wooden pallet 100 to which a package 201 is a secured. The package 201 is stored on the top shelf of a high stack storage shelf 305. Typically, retrieval is performed by raising the forklift blades to the level of the insertion slots 109A, 109B of wooden pallet 100 on which the palletized goods rest, and advancing the forklift machine so as to insert the forklift blades into the insertion slots. The pallet is raised when the blades are fully inserted.

Returning to FIG. 2, even when packages include an integral disposable pallet, the package 201 is often secured to a wooden pallet by strapping bands to improve stability and safety when moved via a fork lift machine. In securing a package in this manner, strapping bands are typically threaded through the cavity between a upper and lower deck boards. Strapping bands running widthwise between the upper and lower deck boards secure the package to the wooden pallet by wrapping around the outer stringer boards. Strapping bands running lengthwise between the upper and lower deck boards secure the package to help by wrapping around some or all of the deck boards.

To secure a large package to a pallet, the tensile force applied to each strapping band can be several hundred pounds. When a package is secured to a wooden pallet, the force transmitted by the strapping bands to the deck boards is often enough to pull the deck boards off of the stringer boards, or even crack the deck boards.

In addition to the damage caused to wooden pallets by strapping bands, forklift machines progressively destroy wooden pallets. A collision between the forklift blades 303 and the wooden spacer blocks 107 frequency occurs during blade insertion. Because forklift machines are generally quite powerful, a single such collision can loosen, dislodge, or even split a wooden spacer block. Additionally, a forklift machine often lacks sufficient room to approach a pallet head-on for direct insertion of forklift blades into the insertion slots 109A, 109B. To rotate a wooden pallet, a forklift machine driver will insert the tips of the forklift machine blades into the insertion slots 109A, 109B, turn the steering wheel of a forklift machine sharply, and backup, thereby forcing the forklift blades into the wooden spacers 107, exerting a lateral force sufficient to rotate a pallet. The heavier the load, the more force is required to rotate the pallet. Again, the force required to perform this maneuver takes its toll on wooden spacers, which are eventually loosened, dislodged, or destroyed. Additionally, hand pallet trucks typically have a pump action handle that hydraulically raises the lift-blades relative to the wheels, exerting thereby downward force against the wheels equal to the upward force necessary to raise the pallet. If the wheels are resting on a lower deck board, as the pallet is raised by the hydraulic cylinder, a deck board pinned underneath the wheel is ripped from the stringer boards, or split in two.

Damage to wooden pallets is an ongoing process in most warehouse environments. Because of this, a large warehouse may have a team of workers dedicated to the continual repair of pallets. Alternatively, a warehouse they may simply purchase an inflow of new pallets. Even when repaired, most pallets reach their repair limit, after which they are simply discarded, or disassembled and cannibalized for whatever usable wood might be left. This ongoing repairer and replacement of wooden pallets represents a significant expense for many companies.

Table 1 references the ten most common sizes of wooden pallets used in the United States, along with the industries that frequently use these respective sizes. Dimensions of Table 1 are in inches.

TABLE 1

| Grocery | 48 × 40 |
| Telecom, Paint | 42 × 40 |
| Drums | 48 × 48 |
| Cement | 40 × 48 |
| Chemical | 48 × 42 |
| Dairy | 40 × 40 |
| Automotive | 48 × 45 |
| Drums, Chemical | 44 × 44 |
| Beverage | 36 × 36 |
| Beverage, shingles, packaged paper | 48 × 36 |

Because these ten sizes represent only about sixty percent of the total number of pallets used in America, it can be readily appreciated that there is no "official" size for a pallet. Additionally, European nations and other metric regions add to the variety of pallet sizes, as illustrated in Table 2. Dimensions of Table 2 are in centimeters.

TABLE 2

| ⅛ Euro | 40 × 30 |
| ¼ Euro | 60 × 40 |
| ½ Euro | 80 × 60 |
| Euro ISO 1 | 80 × 120 |
| Euro ISO 2 | 100 120 |
| | 114 × 114 |
| | 1iO × 110 |

Because of the expense in maintaining and replacing wooden pallets, industry has sought alternative solutions. Disposable cardboard pallets have been fitted with "feet" configured to raise a package a sufficient distance from the ground to allow insertion of forklift blades beneath the package. Feet integrally coupled to a carton or a disposable pallet are often cylindrical in shape, or may define a conical frustum. They are commonly in the range of six inches in diameter, and may be formed from molded plastic, with flanges extending horizontally from the upper limit of the cylinder. Corrugated cardboard layers above and below these flanges secure the feet to the carton or disposable pallet. The addition of feet to a disposable pallet however, significantly increases the cost of a carton or disposable pallet. Moreover, because a disposable pallet lacks the rigidity and strength of a wooden pallet, such designs cannot fully replace the functionality of traditional wooden pallets, and sometimes function as a limitation.

There remains therefore need for a method and apparatus for eliminating or reducing the ongoing expenses associated with procurement, repair and replacement of wooden pallets while retaining many of the advantages of wooden pallets.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A depicts an exploded view of conventional prior art wooden pallet.

FIG. 2 depicts a package banded to a prior art disposable pallet resting on a conventional wooden pallet.

FIG. 3 depicts a side elevation view of a forklift machine retrieving a palletized package from a prior art multi-tier storage location.

FIG. 4 depicts a perspective view of a plurality of metal risers resting on front and rear load beams out of a storage shelf FIG. 4A depicts an isolated view of the pallet stop shown in FIG. 4.

FIG. 5 depicts a forklift machine retrieving a package from a shelving section fitted with the risers of FIG. 4.

FIG. 6A depicts an embodiment of an adjustable riser resting on front and rear load beams.

FIG. 6B depicts a side view of the riser assembly of FIG. 6A as viewed from the perspective of cut lines 6B.

FIG. 6C depicts a riser not fixed to a load beam and having sidewalls splayed in opposite directions.

FIG. 6D depicts a riser with outward turned flanges secured in place by threaded bolts.

FIG. 6E depicts a riser with inward turned flanges with through holes for securement to a load beam.

FIG. 6F depicts a riser with a hard rubber nose cone for preventing snagging, scraping, cutting, or other personal injury by the edges of a riser.

DETAILED DESCRIPTION

FIG. 4 depicts a perspective view of a riser deck comprising elongated metal risers 403A, 403B having a proximal end toward the lower left of the figure, and a distal end toward the upper right of the figure. The metal risers are supported by front and rear riser-deck cross beams 675A, 675B. As used herein, the term "section" of a shelf is used with reference to a width of shelving area configured to store a single palletized package (including a traditional wooden pallet and a disposable pallet) or a package or object of suitable size. The riser deck assembly of FIG. 4 depicts a "deckless" embodiment. However, the riser deck embodiments described herein can also be used in conjunction with "decked" shelves, including, but not limited, to wire deck shelves. The elongated metal risers 403 are disposed in parallel alignment. The proximate end of the metal risers preferably extends forward of the front riser-deck cross beam 675A, and the distal end of the metal risers preferably overhangs the rear riser-deck cross beam 675B. The risers within a shelving section are uniform in height H, and having sufficient strength to support a package disposed thereon. In the embodiment depicted in FIG. 4, a shelving section comprises two side risers 403A, and at least one center riser 403B disposed therebetween. The width W2 of the center riser 403B is illustrated as being slightly narrower than the width W of the left and right side risers 403A. However, alternative embodiments are envisioned wherein the width of the center riser is equal to, or greater the widths of the side risers 403A.

Figure 1B:
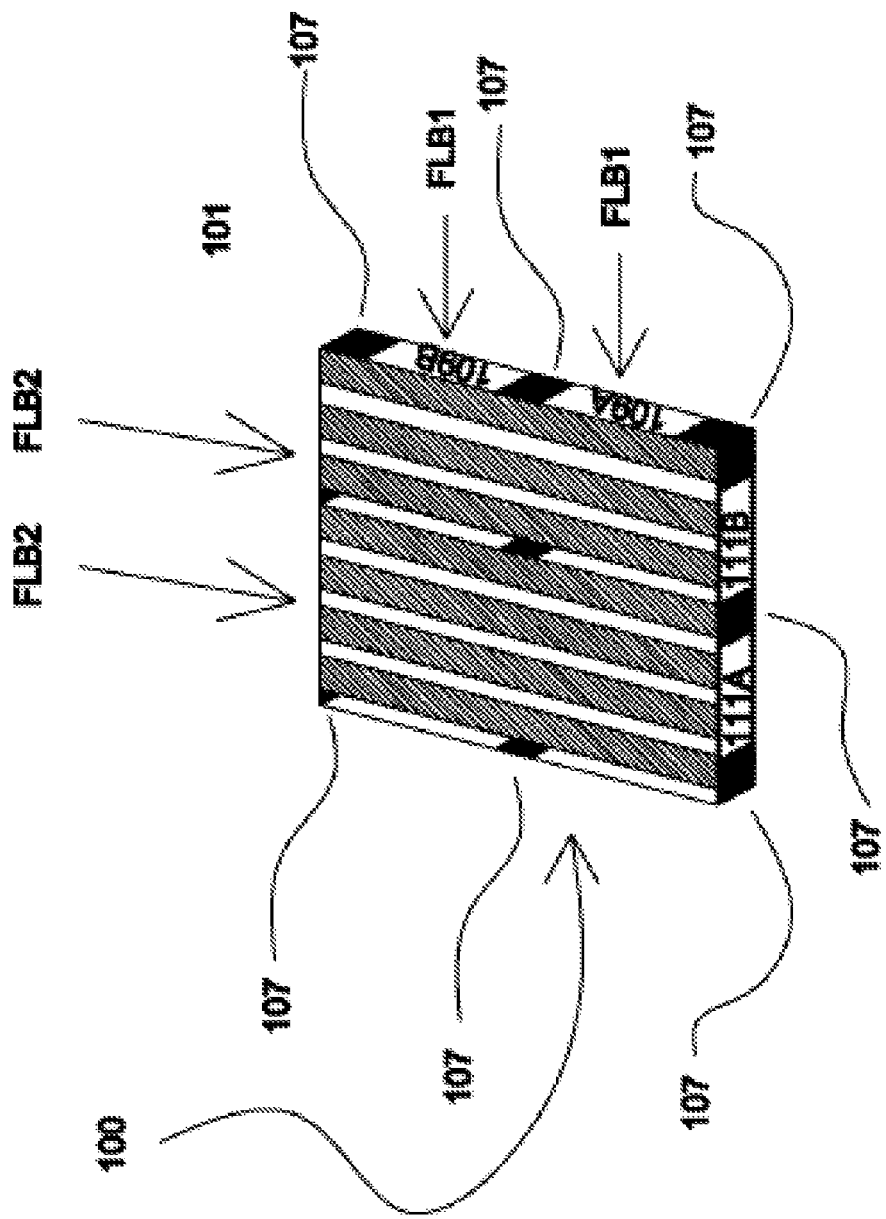
FIG. 1B depicts a perspective view of prior art the wooden pallet of 1A.
Figure 7:
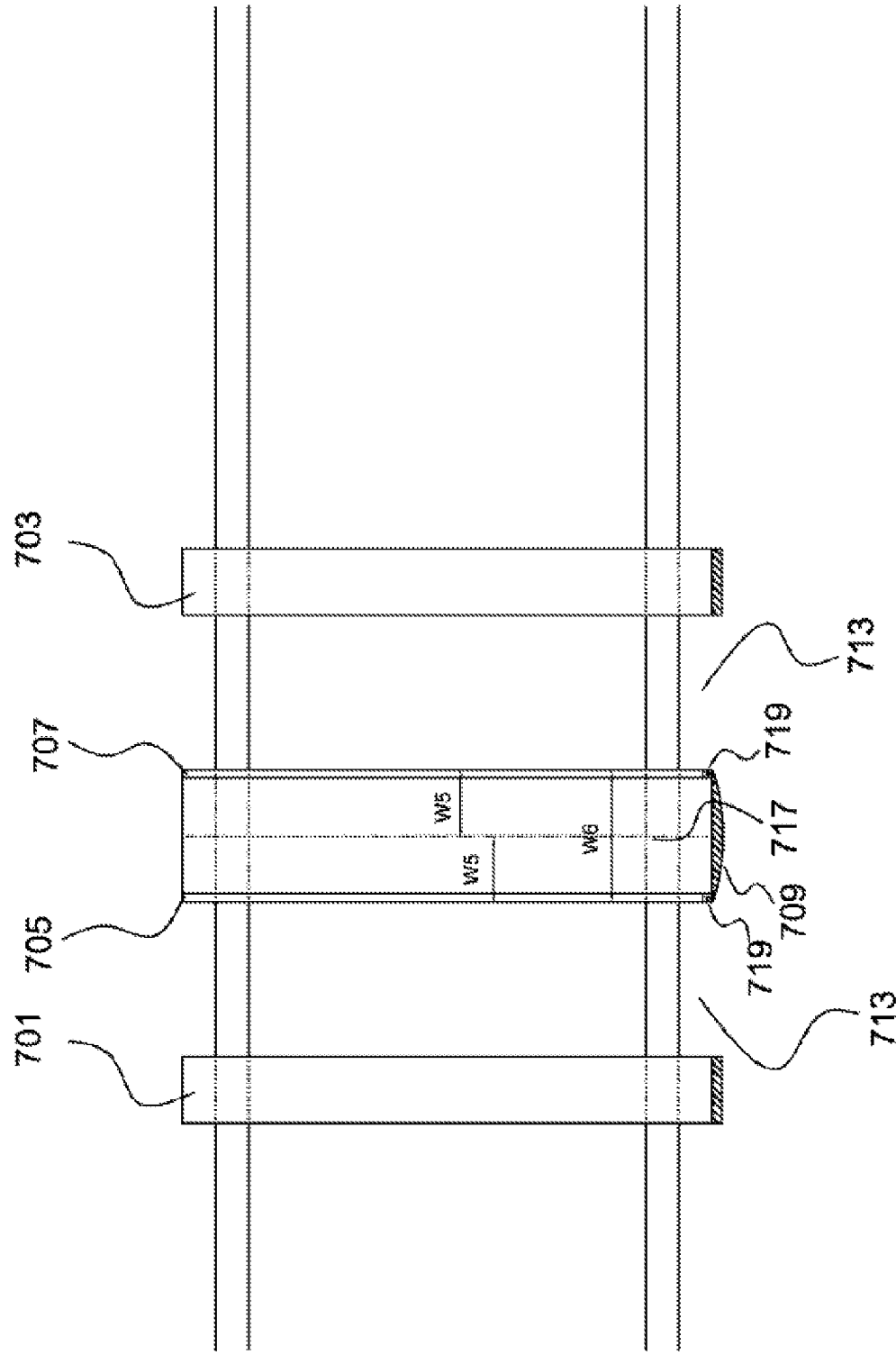
FIG. 7 depicts an embodiment of a riser deck comprising multiple center risers with a riser stop extending between them.

According to the embodiment depicted in FIG. 4, two insertion channels 413 are formed on opposing sides of the center riser. Referring briefly to FIG. 5, each of the insertion channels is configured to receive one of the forklift blades 303 of a two-blade forklift machine. In a less preferred embodiment, a section of a shelving assembly may have no center riser, allowing a fork lift machine to store or retrieve a package by inserting both blades into the expansive gap between the left and right risers. Alternatively embodiments are also envisioned wherein a section of a shelving assembly has multiple center risers, as depicted in FIG. 7.

One benefit of the riser shelving assemblies described herein is that traditional wooden pallets are not needed to safely store and retrieve packages or disposable pallets by fork lift machine. Through the use of metal risers, the blades of a forklift machine can be positioned beneath a package by inserting the blades into the insertion channels 413, thereby allowing a forklift machine to store or retrieve any stable flat bottomed object or package whether or not it is stored on a wooden pallet, including, but not limited to, a corrugated cardboard box, a wooden crate, a steel barrel (e.g. a 55 gallon drum), a wooden barrel, a cardboard barrel, or an unpackaged item. However the use of pallet risers described herein does not prohibit the use of wooden pallets to which a package or object may be already be secured. Accordingly, specific examples offered throughout this disclosure, which make frequent reference to the storage and retrieval of a disposable pallets, are not intended to limit the uses and applications of the risers described herein, nor should they be construed so as to the scope of the appended claims, which fully comprehend the storage of items and packages as described throughout.

In view of the wide range of pallet sizes illustrated in Tables 1 and 2, the reader will readily appreciate that there is no "standard" width for a section of shelving, because there is no "standard" width of a pallet. Accordingly, a shelving section must be configured to accommodate the package or disposable pallet of a predetermined width. The overall width of the shelving section of FIG. 4 is equal to the combination of the widths W1 of each of the side risers 403A, the width(s) W2 of the center riser(s) 403B, and the widths W3 of each of the insertion channels 413, as well as additional space to the right on the right side and riser and the left of the left side riser, into which the outer edges of a packet may extend. In any embodiment, however, the width W3 of each insertion channel 413 must be wide enough to receive a forklift blade, with reasonable tolerances for accommodating inaccuracies and positioning the forks of a forklift machine under normal warehouse conditions. Ideally, the width W3 of each insertion channel is greater than or equal to 12 inches. However, in view of the wide range of potential wooden pallet sizes historically available, storage sections with steel risers are envisioned wherein the widths W3 of individual insertion channels 413 are less than 12 inches.

Risers can be formed from a rigid material having sufficient strength to support the weight of objects stored thereon. As noted in conjunction with the prior art, fork lift machines often split the wooden blocks of a pallet due to the force of impact. It can be readily appreciated that, in multi-tier shelves, fork lift machine drivers often work on racks above there heads with limited vision, particularly resulting in frequent damage to pallets. It can be appreciated that risers formed of wood would simply replicate the problems associated with wooden pallets. Accordingly, the preferred embodiment a metal alloy riser, and more preferably a steel or aluminum alloy riser, which is impervious to splitting, as experienced by wooden pallet blocks. However, specific references to steel risers, aluminum or metal risers throughout this disclosure are offered as examples, and are not intended to limit alternative riser embodiments envisioned within the scope of the appended claims, including, but not limited to risers comprised of other metals and metal alloys, as well as fiberglass, wood, plastic, concrete, ceramic, clay, composites, polymers, epoxies and combinations thereof.

In the embodiment of FIGS. 4, 6A and 6B, the metal risers are formed from elongated sheet steel having two right angle bends extending the length of the metal sheet, thereby forming a horizontal support deck 409 disposed between parallel left and right sidewalls 407A, 407B. The height of a riser is therefore approximately equal to the height of the sidewalls. The risers are preferably comprised of a steel alloy, and having a thick enough gauge to support anticipated loads, and to withstand the punishment of misdirected forklift machine blades without needing requiring continual repair or replacement. Although the required metal gauge of steel sheet will vary according to the width of a riser, the height of a riser, and the anticipated loads which will be stored thereupon, roll formed steel having a thickness of between 16 gauge and 10 gauge is preferable for most risers. However, specific references to "steel sheet" are offered only as an example to more clearly explain and illustrated, and enable the reader to make and use the invention described in the appended claims. These specific examples are not intended to limit the scope of the appended claims, which envisions alternative shapes and forms of steel and metal risers, including, but not limited to, steel risers made from C-channel, structural steel, or steel plate. I-beams preferably made of aluminum are also envisioned. Additionally, risers may be formed from any rigid material of sufficient strength to store anticipated loads.

Because an excessive concentration of force on a small area can damage packaging, and can even damage the contents stored therein, the combined widths of the side and center risers is preferably at least 20% of the total width of the package supported thereon, and more preferably at least 30% of the total width of the package supported thereon, thereby distributing the weight of the package over a greater area. Moreover, embodiments are envisioned wherein the combined widths of the side and center risers are at least 40% of the total width of the package supported thereon and even more preferably at least 50% of the total width of the package supported thereon. Depending upon the anticipated width of a package to be stored in a shelving section, an embodiment of FIG. 4 utilizes a center riser greater than or equal to about four inches (100 mm) in width, and side risers greater than or equal to about least six inches (150 mm) in width, thereby minimizing an excessive concentration of pressure on the bottom of the package. However, center risers less than 100 mm and side risers less than 150 mm are also envisioned.

According to the depiction of FIG. 4, the risers slightly overhanging at least part of the front and rear load beams, and more preferably, each riser completely overhangs the front and rear load beams, thereby ensuring that the weight of a package is not transmitted directly into an unsupported portion of wire deck. This depiction, however, is not intended to limit alternative embodiments wherein the front and/or rear edges of a metal riser are flush with the corresponding front and rear edges of a shelf, or recessed so as to be disposed between the front and rear edges of the shelf.

To prevent a package from being stored too far to the rear of shelf, and possibly falling off the rear of the shelf, pallet stops 405 are disposed at the rear end of each riser. FIG. 4A depicts an isolated view of an embodiment of a pallet stop shown in FIG. 4. The pallet stopped 405 is formed from a rigid piece of wire having two parallel attachment segments 425 aligned along the x-axis. Both attachment segments 425 comprise identical 90° upward bends, extending into parallel vertical members 427 aligned along the y-axis. The upper end of each vertical member has a 90° bend inward along the z-axis, thereby forming a horizontal stop ridge 429 extending between the upper ends of the two vertical members. As illustrated in phantom in FIG. 4, each of the attachment segments 425 is welded 431 in place at an interior corner formed at the juncture of the horizontal support deck 409 and a respective left or right sidewall 407A, 407B. In an alternative embodiment, a pallet stop may be formed by bending a portion of the horizontal support deck 409 upward at approximately a 90 degree angle.

The rises are welded securely to the wire deck, as shown by welds 415 in FIG. 4. However, a variety of circumstances may arise wherein warehouse personnel desire to alter the spacing of risers. For example, industry may standardize pallet sizes to reduce the number of diverse sizes, requiring a warehouse to alter the space allotted for certain packages or goods. A warehouse may begin to stock goods from a different source, or goods having a different "footprint." Alternatively, warehouse personnel may determine that the space between sections is too narrow for the drivers of fork lift machines to store goods safely and efficiently. For these, and any other number of reasons, a warehouse may desire pallet risers that are removable, slidable, or otherwise adjustable, so that the width of specific select risers, or the spacing between select risers may be adjusted.

FIG. 6A illustrates an embodiment of a riser extending between the front load beam 411A shown as a C-bracket and the rear load beam 411B also shown as a C-bracket. The riser 603 is removably secured to the front and rear load beams by a securement mechanism 639, shown in FIG. 6B as a threaded bolt 640.

As used herein, the terms "bolt" and "screw" are used interchangeably, an include, but are not limited to grooved heads for standard screwdrivers, cross grooves for Philips head or reed and prince screw drivers, hex head bolts, allan wrench heads and torx wrench type bolts, and smooth head bolts that have no means on the bolt head for applying torque to the bolt. Because raised right angle bolts such as hex-head, torx wrench and allan wrench type bolt heads are more likely to catch on a package or strapping band during loading and unloading, threaded bolt embodiments will preferably be include low profile round headed bolts, or countersunk flat head screws. However, the appended claims fully comprehend any variety of cross pin securement devices, including non-threaded shafts such as cotter pins, and threaded cross pins with any type of head.

When tightened, a threaded bolt 640 of FIG. 6 will impart significant upward force into the bottom surface of hollow tubular load beam 613A, and a significant downward force on the top surface of the riser 603. To prevent the indentation and destruction of these respective structures, a variety of force distribution methods may be used. As shown in the inset FIG. 6B, the force is distributed over a greater surface area on the bottom surface of front load beam 613A and over the horizontal support deck of the riser 603 by means of a washer plates 647, 648. The threaded shafts 643 extend through respective holes within the washer plate, and are held securely in place a threaded nut 651 and lock washer 649. Individual washers can be used in place of the washer plate if the washers are large enough to distribute a force in a manner sufficient to prevent damage to the load beam.

Screwdriver slots can become gauged during rotation, forming sharp metal tags that can catch on packaging or strapping bands. In a preferred embodiment, therefore, smooth-head bolts 640 having a low rounded profile heads 641 are used to secure a riser to a load beam, thereby eliminating the tags and sharp edges formed on a screwdriver slot. The section of shaft proximate the distal end of the smooth-head bolt is a threaded cylinder 643, and the section of shaft 642 coupled to the bolt head is non-cylindrical. Examples of non-cylindrical ends are bolts having square shafts coupled to the bolt head. By this shaft configuration, the square segment of the shaft can be held in place by a square hole in the washer plate, and the threaded end can be tightened with a nut without the need of a counter force applied to the head by a tool. In addition to the use of lock washers to prevent loosening, a chemical adhesive such as "Lock Tight" can applied to the junction of the threaded shaft and the nut to ensure a secure coupling which will not loosen unless torque is applied.

An alternative, or supplemental means of reinforcement for the risers is depicted in FIG. 6B. A wooden plug 645, which is preferably at least the width of the load beam, is configured to substantially fill the cross sectional area within the interior of the riser. The wooden plug thereby exerts a resistive force against the interior surface of the riser 603 to prevent the indentation and collapse. Guide holes within the wooden plug are preferably unthreaded to facilitate easy insertion and withdrawal of the threaded shafts 643. The rear load beam 61 1B depicts an L-bracket embodiment. In such embodiments, a washer plate 647 is not necessary to prevent the deformation of a load beam.

In the various embodiments of FIGS. 6A and 6B, the load beams 611A, 611B have pre-drilled holes which allow the adjustment of risers to the left or right. Additionally, a riser which is damaged, or which is the wrong width or gauge may be removed and replaced. It will be readily appreciated by those of ordinary skill in the art that load beams formed by L-brackets do not have pressure exerted against an empty cavity, and therefore do not need force spreading devices such as washers or washer plates to distribute force over a greater area.

In addition to the potential indentation of a hollow load beam or hollow riser, due to excessive tension imposed by a bolt, FIG. 6C illustrates a riser 603 experiencing a downward force F on the support deck 653 resulting in a splaying of the left and right sidewalls 655.

FIG. 6D illustrates alternative embodiments of flanged risers which prevent splaying, and eliminate the need for washer plate on the support deck of a riser. Riser 661 comprises outward turned flanges 663, each flange having at least one through-hole 665 near the proximal end of the riser, and at least one through-hole 667 near the distal end of the riser. Threaded bolts 669 (shown in exploded view) are inserted through the through-holes 665 and secured to a load beam (not shown) or other structurally adequate member of a shelving assembly. The riser deck cross beam 675 is an L-bracket having a vertical ledge and a horizontal ledge, with through-holes 677 disposed along the horizontal ledges of the riser deck cross beam.

FIG. 6E displays an alternative embodiment of a flanged riser 679 having inward turning flanges 681 with through holes for securement to a load beam by threaded bolts, as depicted and explained in conjunction with FIG. 6I). Because of the use of L-Bracket load beams in conjunction with flanged risers, the threaded bolts compress metal against metal in the embodiments of FIGS. 6D and 6E. As a consequence, no washer plate is required to distribute weight across a large surface, eliminating the cost of washer plates and wooden inserts discussed previously. Accordingly, flanged risers used in conjunction with L-Bracket load beams can reduce or eliminate the possibility of several potential catastrophic failures of metal risers.

As depicted in FIG. 6F, a nose cone 683 is advantageously attached to the proximal end of a riser to prevent warehouse personnel or customers from cutting themselves on sharp edges, particularly on forward protruding risers on lower shelves. Without limiting the appended claims to any one embodiment, nose cones can be advantageously formed from hard rubber such as used in hockey pucks formed into a rounded shape protruding from the proximal end of a riser is tough enough to resist destruction by fork lift blades, and yet soft enough to protect warehouse employees or consumers from cutting or scraping themselves on a metal riser.

FIG. 7 depicts a shelving section comprising a left outer riser 701, a right outer riser 703, a left center riser 705 and a right center riser 707. A channel stop 709 ensures that a forklift machine driver does not mistake the area between the left center riser in the right center riser as an insertion channel. This distinction may be further enhanced by the use of one color for a channel stop in another color for at least the front ends of the left outer riser 701 and the right outer riser 703. An advantage of the embodiment in FIG. 7 is that left and right forklift blades respectively entering the left channel 713 are separated from the center line 717 of the shelving section to ensure a greater minimum stability of a package being retrieved by a forklift machine. In embodiments where in the spacing between risers is adjustable, channel stops of multiple alternative sizes can be attached and detached from the ends of center risers 705, 707 attachment points 719. A single center riser having the width W6 can also be used to the same effect as the embodiment depicted in FIG. 7.

Figure 8:
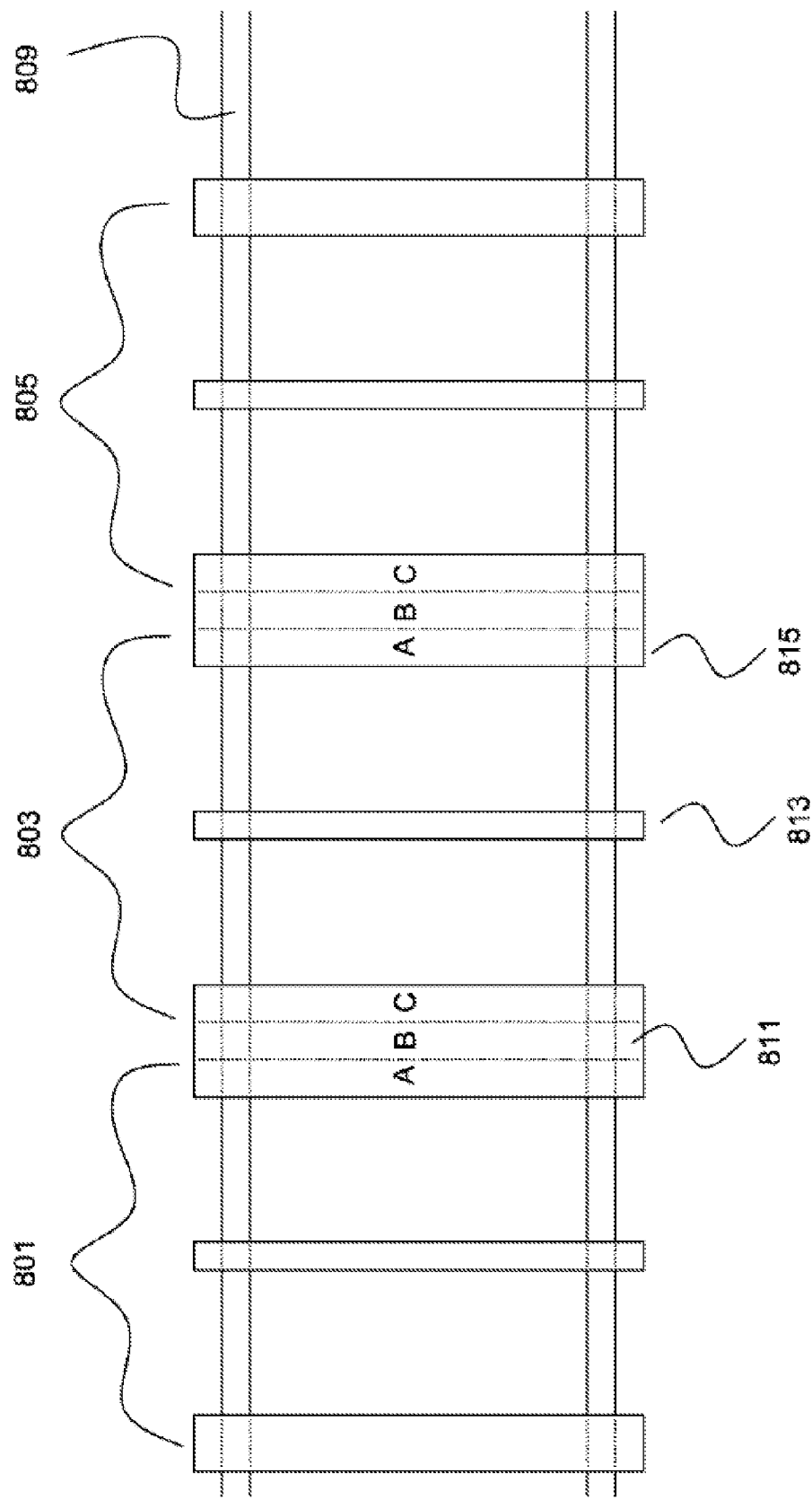
FIG. 8 depicts a top plan view of a riser deck assembly wherein a single common side-riser serves as a side riser for adjacent storage sections.

FIG. 8 depicts an alternative embodiment wherein separate shelving sections 801, 803, 805 share a sided riser 811, 815 with an adjacent section. Each set of parentheses within the figure defines the width of a shelving section, which is further identified by dotted lines extending below the distal ends of the parentheses. Section A of riser 811 comprises the right side of riser of shelving section 801 section C of riser 811 comprises the left side of riser of shelving section 803. Section B of riser 811 represents a neutral space between sections 801 and 803. The width of the neutral space B is preferably between 2 inches and 12 inches. However, embodiments of less than 2 inches and greater than 12 inches are envisioned.

Figure 9:
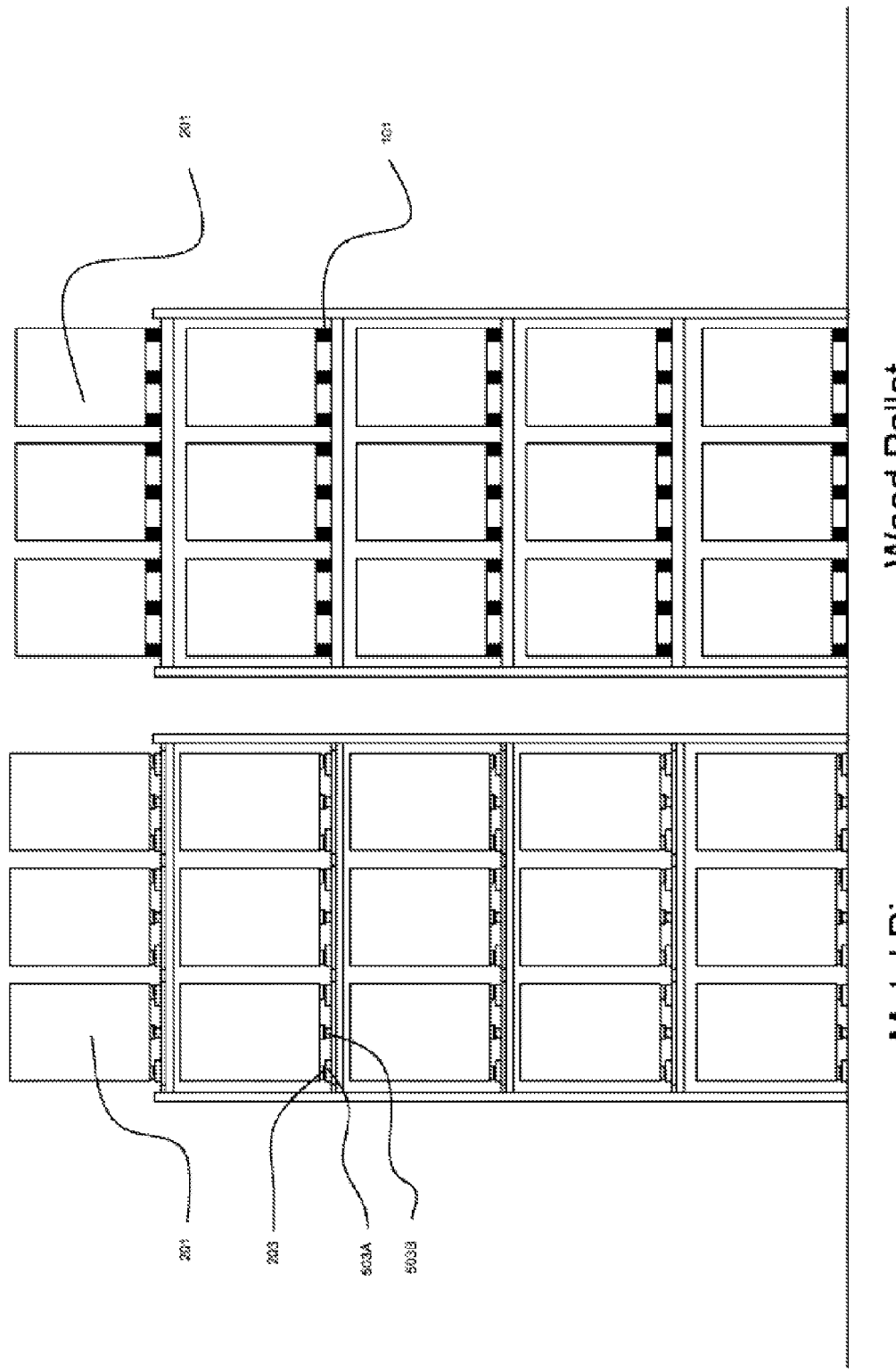
FIG. 9 depicts a side elevational view of a high rise shelf with riser decks (left) and a high rise shelf with conventional pallets (right).

FIG. 9 depicts a side elevation view of adjacent high-rise shelving structures. The left hand shelving structure has metal risers for granting fork blade access to a package. The right hand shelving structure utilizes traditional shelving technology, and therefore requires storage on traditional wooden pallets. As discussed above, a forklift machine is often required to drive forward in a calculated speed with the distal end of the forklift blade scraping the warehouse floor in order to slide the fourth of blades beneath a package. The use of plastic or cardboard "feet" integral to a disposable palette allows a corporate machine driver to insert forklift blades beneath a package in a more controlled manner. Such feet, however, are frequently limited to one or two inches in height. Although such an elevation can enhance the use of a forklift machine on a warehouse floor, this elevation is not sufficient by itself to allow a forklift machine driver to retrieve packages stored overhead in a high-rise storage shelf as depicted in FIG. 9. Accordingly, the advantage is gained through the use of metal risers as shown in the left hand high-rise shelving assembly of FIG. 9, is not obviated through the use of "feet" commonly found on disposable pallets.

As a forklift machine approaches a shelf, pallets and objects on higher shelves become more difficult to see clearly. Accordingly, embodiments are envisioned wherein the height of the risers, and/or the width of the insertion channels increases with higher shelves to compensate for the difficulty in aligning fork lift blades properly on higher shelves.

Figure 10:
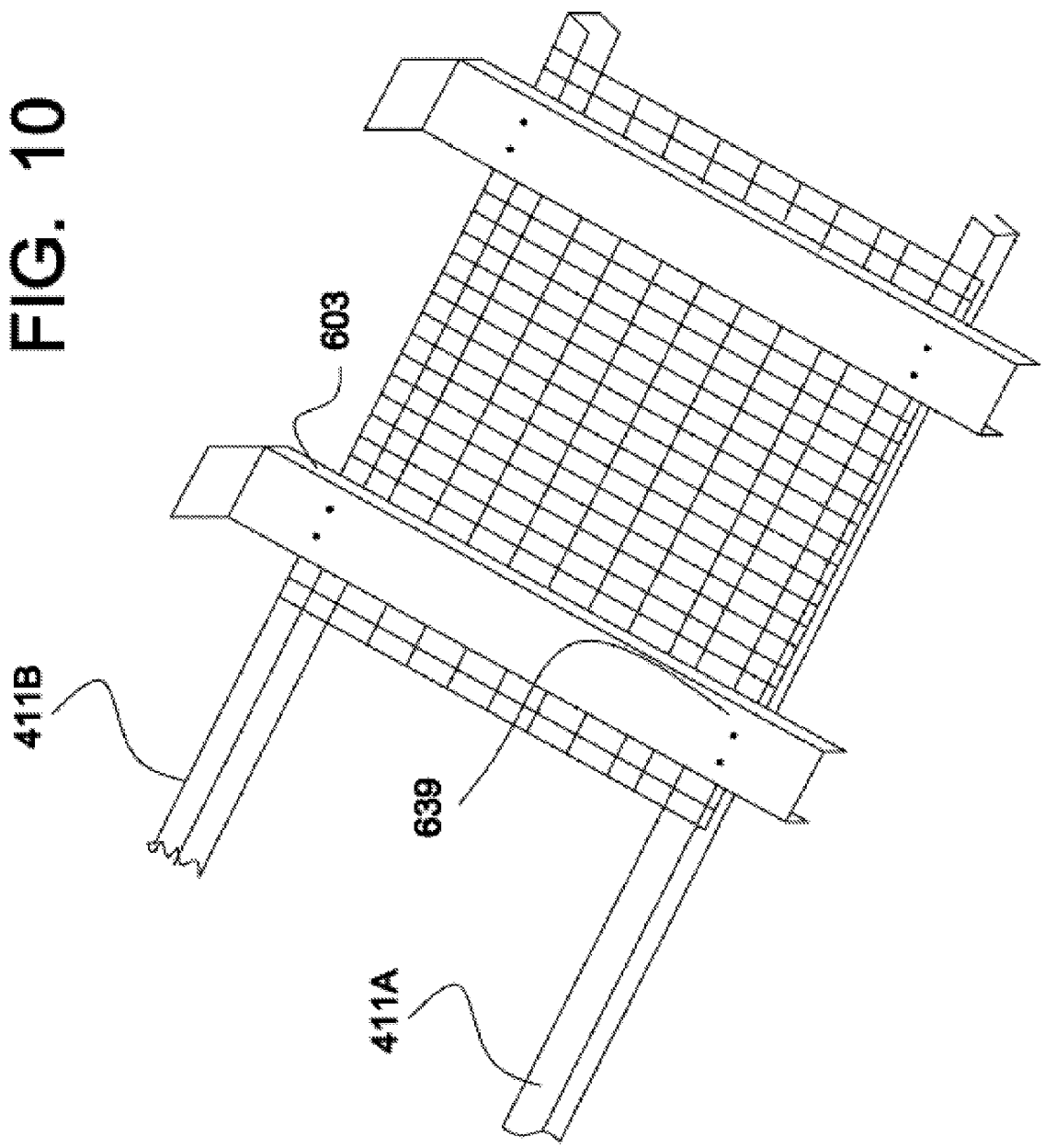
FIG. 10 depicts a wire deck embodiment.

FIG. 10 depicts a wire deck embodiment of a riser configuration of FIG. 6A.

Figure 11:
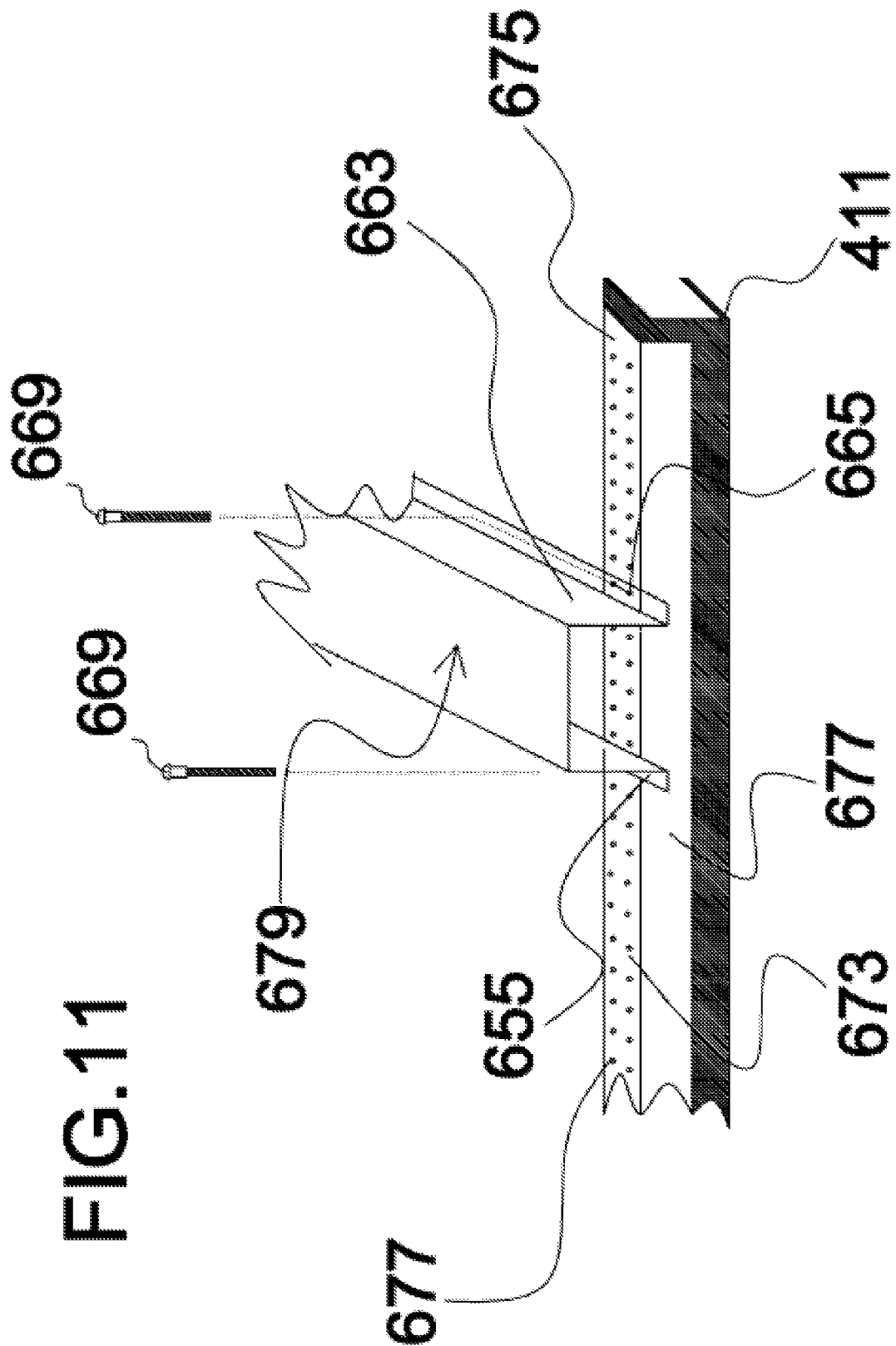
FIG. 11 is an embodiment of the riser deck depicted in FIGS. 4 and 5.

FIG. 11 depicts a riser deck embodiment such as depicted in FIGS. 4, 5 and 6D. Riser 679 comprises sidewalls 663 with outward turned flanges 655, each flange having at least one through-hole 665 near the proximal end of the riser, and at least one through-hole (not shown) near the distal end of the riser. An embodiment utilizing threaded bolts 669 (shown in exploded view) depicts the bolts inserted through the through-holes 665, through holes 677, and secured to a load beam 411 or other structurally adequate member of a shelving assembly. FIG. 11 depicts a riser deck cross beam 675 in the form of an L-bracket having a vertical ledge 677 and a horizontal ledge 673, with through-holes 677 disposed along the horizontal ledges of the riser deck cross beam.

What is claimed is:

1. A shelving assembly for storing objects, comprising:
    first and second load beams; and
    adjacent first and second shelving sections, each shelving section extending from the first load beam to the second load beam, wherein each shelving section comprises a first plurality of elongated risers oriented generally perpendicular to the first load beam, each riser having front and rear segments terminating in proximal and distal ends respectively, the front segment of each riser securely being coupled to the first load beam by at least a removable first securement member, and a rear segment securely coupled to the second load beam by at least a removable second securement member, said first plurality of elongated risers including a left side riser and a right side riser, said left side riser being affixed to said first and second load beams by said first and second securement members respectively, and said right side riser being separately affixed to said first and second load beams by a discrete pair of first and second securement members, wherein at least one insertion channel is formed between the left side riser and the right side riser, said at least one insertion channel being configured to receive first and second fork blades of a forklift machine.

2. The assembly of claim 1, wherein the plurality of elongated risers further comprises
    a first center riser disposed between the left side riser and the right side riser, and wherein said at least one insertion channel comprises a first insertion channel disposed between the left side riser and the center riser, and a second channel disposed between the center riser and the right side riser, each channel having a width sufficient to receive a forklift blade of said forklift machine.

3. The assembly of claim 1, wherein at least one riser is comprised of metal.

4. The assembly of claim 3, wherein said at least one riser is a steel riser.

5. The assembly of claim 3, wherein the at least one riser comprises first and second vertical support walls having upper and lower edges, and a horizontal support deck extending between the upper edges of the first and second vertical support walls.

6. The assembly of claim 5, wherein the at least one riser comprises a sheet metal, and wherein an intersection of the first vertical support wall of said at least one riser and the horizontal support deck of said at least one riser comprises a bend.

7. The assembly of claim 1, wherein at least one riser further comprises a first pallet stop configured to prevent a pallet from sliding off of the rear segment of said at least one riser.

8. The assembly of claim 7, wherein the first pallet stop comprises a rigid vertical structure coupled to the rear segment of said at least one riser.

9. The assembly of claim 8, wherein the first pallet stop is welded to the riser.

10. The assembly of claim 8, wherein the first pallet stop comprises a rigid wire rod having at least one bend.

11. The assembly of claim 1 further comprising a shelf extending from the first load beam to the second load beam.

12. The assembly of claim 11, wherein at least one riser is coupled with the first and second load beams by an indirect coupling, including a first coupling member coupling the shelf to the front and rear load beam, and a second coupling member coupling said at least one riser to the shelf.

13. The assembly of claim 11, wherein the shelf comprises a wire deck.

14. The assembly of claim 1, wherein the first and second securement members comprise welds.

15. The assembly of claim 1, wherein at least one securement member includes a threaded shaft.

16. The assembly of claim 1 further comprising a second plurality of rigid risers including a second center riser, the second plurality of risers being configured to support a second package adjacent the first package when a geometric center line of the first package is disposed above the longitudinal axis on the first center riser and a geometric center line of the second package is disposed above the longitudinal axis of the second center riser.

17. The assembly of claim 1 wherein adjacent shelving sections do not share a common riser.

18. The assembly according to claim 5 further comprising a horizontal flange structure extending from a lower edge of the first vertical support wall.

19. The assembly of claim 1 further comprising a protective nose cone coupled to the proximal end of at least one of said risers.

20. A shelving assembly for storing objects, comprising: first and second load beams generally parallel to each other; and at least six elongated risers oriented generally perpendicularly to the first load beam and generally parallel to each of the other elongated risers, each of the elongated risers having a front segment generally resting on said first load beam and having a rear segment generally resting on said second load beam, the front segment of each riser being secured to the first load beam at a selected position along the lateral length of the first load beam by a discrete securement member, and spaced from adjacent of said at least six elongated risers to form two generally similar patterns of three such risers, each pattern of such risers defining in the two lateral spaces between the three such risers two generally parallel channels sized and configured to receive first and second fork blades of a forklift machine.

21. A shelving assembly for storing objects, comprising:
first and second load beams generally parallel to each other; and
at least five elongated risers oriented generally perpendicularly to the first load beam and generally parallel to each of the other elongated risers, each of the elongated risers having a front segment generally resting on said first load beam and having a rear segment generally resting on said second load beam, the front segment of each riser being secured to the first load beam at a selected position along the lateral length of the first load beam and spaced from adjacent of said at least five elongated risers to form two generally similar patterns of spacing between three such risers, each pattern of such risers defining in the two lateral spaces between the three such risers two generally parallel channels sized and configured to receive first and second fork blades of a forklift machine.

* * * * *

UNITED STATES PATENT AND TRADEMARK OFFICE
CERTIFICATE OF CORRECTION

| | |
|---|---|
| PATENT NO. | : 9,266,673 B2 |
| APPLICATION NO. | : 13/570135 |
| DATED | : February 23, 2016 |
| INVENTOR(S) | : Hamby |

It is certified that error appears in the above-identified patent and that said Letters Patent is hereby corrected as shown below:

In the Specification

Column 1, line 34, "1OSE" should be -- 105E --

Column 2, line 2, "1iIA, 11 1B" should be -- 111A, 111B --

Column 5, line 46, "IiO × 110" should be -- 110 × 110 --

Column 8, line 7, "there" should be -- their --

Signed and Sealed this
Twenty-sixth Day of July, 2016

Michelle K. Lee
*Director of the United States Patent and Trademark Office*